Figure 1:
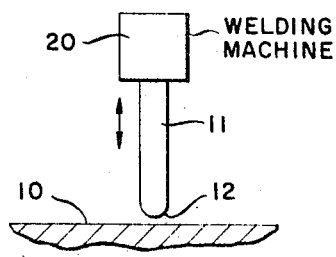

Aug. 5, 1969    J. L. C. DIJKERS ET AL    3,459,610
METHOD AND APPARATUS FOR THE ULTRASONIC
WELDING OF THERMOPLASTIC FILMS
Filed Aug. 3, 1966

INVENTORS:
J. L. C. DIJKERS
L. MICHIELSEN
BY: J. H. McCarthy
THEIR AGENT 3,459,610
**METHOD AND APPARATUS FOR THE ULTRA-
SONIC WELDING OF THERMOPLASTIC FILMS**
Johannes L. C. Dijkers and Ludovicus Michielsen, Delft,
Netherlands, assignors to Shell Oil Company, New
York, N.Y., a corporation of Delaware
Filed Aug. 3, 1966, Ser. No. 569,920
Claims priority, application Netherlands, Aug. 3, 1965,
6510032
Int. Cl. B29c 27/08
U.S. Cl. 156—73          6 Claims The invention relates to a method for the ultrasonic welding to each other of thermoplastic films between an ultrasonically vibrating welding element and a base. In a method of this kind the films are moved over the base beneath the vibrating welding element, a chain of spot welds which essentially form a welding seam, being formed between the films. In this welding method the permissible rate at which the films are passed over the base is subject to restrictions. Once a certain rate has been exceeded it appears to be no longer possible to pass the film material beneath the welding element at an invariably constant rate. The film material repeatedly sticks to the tip of the vibrating welding element and tends to a greater or lesser degree to move forward in little jerks or jumps. During the moments when the film material is briefly held back too many spot welds are made at certain points in the films, with the result that the welding seam is weakened at these points, or that holes may even appear in the film.

On the other hand too few welds are made locally in the film material at moments when the films suddenly shoot forward, the result likewise being a weakening of the welding seam. In extreme cases, moreover, the film material remains sticking around the tip of the welding element and the welding operation has to be interrupted.

The object of the invention is to provide an ultrasonic welding method for thermoplastic films which will permit a considerable increase in the rate of movement of films which has so far been permissible, the above-mentioned drawbacks being avoided.

The method according to the invention is characterized in that the films are passed beneath the welding element and over an elevation in the base while in the vicinity of the elevation the films move free from the base, the direction of movement of the films beign parallel to a plane in which the upper side of the elevation is curved, and the radius of curvature, measured in this latter plane, of the part of the welding surface of the welding element situated opposite the upper side of the elevation being equal to at least five times the radius of curvature of the curved upper side of the elevation.

It has been found that with this novel welding method the rate at which the films can be passed over the base is 50% higher or more than with the welding methods used until now, without the film material sticking to the welding element or to the base, so that no irregular welding seam is formed.

The invention also relates to an apparatus for the ultrasonic welding of thermoplastic films between a welding element moved by ultrasonic vibration and a base, and the apparatus according to the invention is characterized in that the base beneath the welding element is provided with an elevation which possesses at least in one plane a curved upper side, and that the radius of curvature, measured in this same plane, of the part of the welding surface of the welding element situated opposite the upper side of the element is equal to at least five times the radius of curvature of the curved surface of the upper side of the elevation. In the conventional apparatuses for ultrasonic welding the base is usually designed as a flat surface, above which is situated the welding element, provided with a fairly strongly curved welding tip. The base is sometimes also designed as a rotatable cylindrical roll, but even in this case the round welding tip possesses a relatively small radius of curvature. In the apparatus according to the invention the shapes of the welding tip and of the base are more or less the opposites of the conventional shapes, i.e., the base is provided with a curved welding surface (viz. the upper side of the said elevation) and the welding surface of the vibrating welding element is now flat or at most very slightly curved with respect to the curvature of the elevation in the base.

Although in order to achieve good results the radius of curvature of the welding surface of the welding element should be at least five times that of the curved upper side of the elevation in the base, it is desirable for the radius of curvature of the welding surface of the welding element to be as large as possible. This welding surface has preferably an infinitely large radius of curvature; in other words the welding surface is preferably designed as a flat surface with only the edges of the welding surface being somewhat rounded off in order to prevent the films from catching on to these edges.

Figure 2:
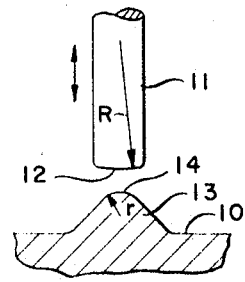
Figure 3:
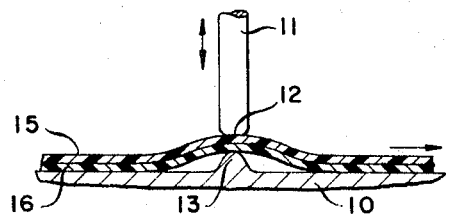
Figure 4:
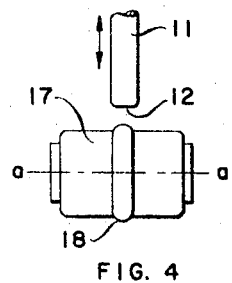
Figure 5:
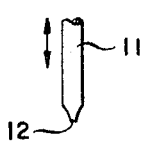
Figure 6:
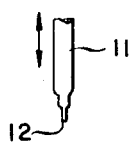

The invention will be further elucidated with reference to the accompanying drawing, which shows diagrammatically some embodiments of a welding element and base of an ultrasonic welding apparatus. FIGURE 1 shows a known embodiment, while FIGURES 2, 3 and 4 show different embodiments according to the invention. FIGURES 5 and 6 show two other embodiments of a welding element to be used according to the invention.

FIGURE 1 shows an immovable flat base 10 above which is situated a welding element 11. The welding element 11 is connected to an apparatus 20 for vibrating the welding element with ultrasonic vibrations in the direction indicated. In the conventional embodiment the welding surface 12 of the welding element 11 has a round shape with a fairly strong curvature. FIGURE 2 shows an embodiment according to the invention in which an elevation 13 with a curved upper side 14 is arranged in the base 10.

The shape of the elevation 13 is such that any cross-section through this elevation, taken parallel to the flat upper side of the base 10, is circular. The elevation 13 is situated opposite the welding element 11 which has a very slightly curved welding surface 12 on its lower side. The curvature of the welding surface 12 and that of the upper side 14 of the elevation 13 both lie in the same plane. Measured in this plane, which corresponds to the plane of the drawing in FIGURE 2, the radius of curvature R of the welding surface 12 at the point where the parts of the upper side 14 and the welding surface 12 are situated opposite each other, is equal to at least five times the radius of curvature $r$ of the upper side 14. The direction in which the films to be welded are passed between the welding element 11 and the elevation 14 of the base 10 is parallel to the upper side of the base 10 and to the plane corresponding to the plane of the drawing in FIGURE 2.

In FIGURE 3 the base 10 with elevation 13 is identical with that of FIGURE 2, but the welding surface 12 of the welding element 11 is now designed substantially completely parallel to the base 10. The thermoplastic films 15 and 16 to be welded are drawn through beneath the welding element 11 in the direction shown by the arrows. Instead of being immovable the base 10 can also be designed as a roll, similar to the cylindrical roll 17 shown in FIGURE 4, which can rotate freely round an axis $a$—$a$ or be driven rotatably round the axis $a$—$a$. On and around the roll 17 is an annular ridge or elevation 18 which can rotate beneath the welding element 11. In FIGURE 4 the welding surface 12 of the welding element 11 has the shape of a flat surface. In this case the films to be welded are passed beneath the welding element 11 while moving with and over the rotating roll 17.

FIGURES 5 and 6 show two further embodiments of the welding element 11, both with a flat welding surface 12.

Finally it may be mentioned by way of example that films of polypropylene having a thickness of 25μ were welded by means of an ultrasonic welding machine 20 operating on a frequency of 20,000 vibrations per second and designed in the conventional manner with a rigid, flat base. At rates of up to 12 m./min. it was possible to obtain a film weld of reasonable quality. At higher rates difficulties arose with the forward movement of the films.

When a welding machine, designed according to the invention but otherwise similar to the above-mentioned machine, was used, good welds were obtained with the same films even at rates of up to 24 m./min. In addition, the quality of the weld was found to be substantially better at lower rates, e.g., 6 m./min., than with films which had been welded at the same rate in the conventional machine.

Corresponding comparative tests with polypropylene films having a thickness of 40μ showed that it was not at all possible to obtain good welds with the conventional machine as a result of the exceptionally difficult forward movement of the film. With the welding machine according to the invention good welds were obtained at rates of up to 6 m./min.

We claim as our invention:

1. A method for the ultrasonic welding of thermoplastic films between an ultrasonically vibrating welding element and a base, characterized in that the films are passed beneath the welding element and over an elevation in the base while in the vicinity of the elevation the films move free from the base, the direction of movement of the films being parrallel to a plane in which the upper side of the elevation is curved, and the radius of curvature, measured in this latter plane, or the part of the welding surface of the welding element situated opposite the upper side of the elevation being equal to at least five times the radius of curvature of the curved upper side of the elevation.

2. An apparatus for the ultrasonic welding of thermoplastic films comprising a welding machine having a welding element adapted for ultrasonic vibration and a base, the base being beneath the welding element and being provided with an elevation which possesses at least in one plane a curved upper side, and that the radius of curvature, measured in this same plane, of the part of the welding surface of the welding element situated opposite the upper side of the element is equal to at least five times the radius of curvature of the curved surface of the upper side of the elevation.

3. An apparatus as claimed in claim 2, characterized in that at least the central part of the welding surface of the welding element is a flat surface.

4. An apparatus as claimed in claim 2, characterized in that the welding surface of the welding element is substantially a flat surface.

5. An apparatus as claimed in claim 3, characterized in that the section of the elevation taken parallel to the base is circular.

6. An apparatus as claimed in claim 2, characterized in that the base with the elevation is formed by a rotatable cylindrical roll having an annularly projecting elevation around the roll.

References Cited

UNITED STATES PATENTS

| 3,272,682 | 9/1966 | Balamuth et al. | 156—580 XR |
| 3,294,616 | 12/1966 | Linsley et al. | 156—73 XR |

PHILIP DIER, Primary Examiner

U.S. Cl. X.R.

29—470; 156—306, 580; 228—1